(12) United States Patent
Turnbaugh

(10) Patent No.: US 10,767,972 B1
(45) Date of Patent: Sep. 8, 2020

(54) MEASURING ASSEMBLIES

(71) Applicant: Mark Turnbaugh, Houston, TX (US)

(72) Inventor: Mark Turnbaugh, Houston, TX (US)

(*) Notice: Subject to any disclaimer, the term of this patent is extended or adjusted under 35 U.S.C. 154(b) by 0 days.

(21) Appl. No.: 16/831,602

(22) Filed: Mar. 26, 2020

(51) Int. Cl.
*G01B 5/06* (2006.01)
*F16C 19/08* (2006.01)

(52) U.S. Cl.
CPC ............... *G01B 5/06* (2013.01); *F16C 19/08* (2013.01)

(58) Field of Classification Search
CPC .............. G01B 5/06; G01B 5/08; G01B 5/12
USPC ................................. 33/529, 543, 555.1, 833
See application file for complete search history.

(56) References Cited

U.S. PATENT DOCUMENTS

| | | | | |
|---|---|---|---|---|
| 3,995,374 A * | 12/1976 | Fisk | ........................ | G01B 5/12 33/544.6 |
| 4,481,816 A * | 11/1984 | Prentice | ................... | G01B 5/12 33/544.2 |
| 4,835,873 A * | 6/1989 | Weems | .................... | F16B 7/182 33/21.3 |
| 5,361,505 A * | 11/1994 | Faughn | .................... | F41A 31/00 33/506 |
| 2010/0263441 A1 * | 10/2010 | Gillan | ....................... | G01B 5/12 73/152.54 |
| 2013/0192077 A1 * | 8/2013 | Colombo | ................. | G01B 5/12 33/701 |
| 2017/0130576 A1 * | 5/2017 | Riise | ........................ | E21B 47/08 |
| 2017/0350682 A1 * | 12/2017 | Loubet | .................... | B21J 15/28 |
| 2018/0363804 A1 * | 12/2018 | Park | ........................ | E21B 7/205 |
| 2019/0368854 A1 * | 12/2019 | Miheli | .................... | G08B 17/10 |
| 2020/0080829 A1 * | 3/2020 | Swenson, Jr. | ............ | G01B 3/46 |

* cited by examiner

*Primary Examiner* — George B Bennett
(74) *Attorney, Agent, or Firm* — Elliott & Polasek, PLLC; Douglas H. Elliott; Nathan Q. Huynh

(57) ABSTRACT

Disclosed herein are measuring assemblies including a measuring assembly for measuring one or more dimensions of a pipe that has an inner surface and an outer surface, which measuring assembly may include: a cylindrical housing capable of being disposed at least in part inside the pipe, the cylindrical housing having an inner housing space and a housing wall with an inner housing surface and an outer housing surface; a bearing disposed in the housing wall; and a probe rotatably coupled to the housing, wherein the probe is capable of providing one or more dimensions of the pipe.

20 Claims, 10 Drawing Sheets

MEASURING ASSEMBLIES

BACKGROUND

1. Field of Inventions

The field of this application and any resulting patent is measuring assemblies.

2. Description of Related Art

Various measuring assemblies and methods for measuring cylindrical objects have been proposed and utilized, including some of the methods and structures disclosed in some of the references appearing on the face of this application. However, those methods and structures lack the combination of steps and/or features of the methods and/or structures disclosed herein. Furthermore, it is contemplated that the methods and/or structures disclosed herein may solve certain problems that prior art methods and structures have failed to solve. Also, the methods and/or structures disclosed herein may have benefits that would be surprising and unexpected to a hypothetical person of ordinary skill with knowledge of the prior art existing as of the filing date of this application.

SUMMARY

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space and a housing wall with an inner housing surface and an outer housing surface; a bearing disposed in the housing wall; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space; a sleeve disposed in the inner housing space; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a housing capable of being disposed at least in part inside the pipe, the cylindrical housing having an inner housing space; a sleeve disposed in the inner housing space; a lock capable of inhibiting movement of the sleeve; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space and a housing wall with an inner housing surface and an outer housing surface; a bearing disposed in the housing wall; a rotatable shaft disposed in the inner housing space; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space; a sleeve disposed in the inner housing space; a shaft rotatably coupled to the sleeve; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a housing capable of being disposed at least in part inside the pipe, the cylindrical housing having an inner housing space; a sleeve disposed in the inner housing space; a lock capable of inhibiting movement of the sleeve; a shaft rotatably coupled to the sleeve; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a housing having a housing aperture and an outer housing surface; a first bearing and a second bearing, wherein the first bearing and the second bearing may extend through the outer housing surface; a sleeve disposed in the housing aperture, wherein the sleeve may be capable of pushing the first bearing and the second bearing against the cylinder; a lock capable of inhibiting movement of the sleeve; a shaft rotatably coupled to the sleeve; an arm coupled to the shaft; and a probe coupled to the arm.

The disclosure herein includes a method of measuring one or more dimensions of a pipe that has an inner surface and an outer surface, which method may include: providing measuring assembly that may include: a housing; a bearing extending through the housing; a shaft rotatably coupled to the housing; an arm rotatably coupled to the shaft; and a probe; disposing a portion of the housing and the bearing in the cylinder; pushing the bearing against the cylinder; and rotating the arm and the probe around the central axis of the cylinder.

The disclosure herein includes a method of measuring one or more dimensions of a pipe that has an inner surface and an outer surface, which method may include: providing measuring assembly that may include: a housing; bearings extending through the housing; a sleeve slidably coupled to the housing; a lock capable of inhibiting movement of the sleeve; a shaft rotatably coupled to the sleeve; an arm rotatably coupled to the shaft; and a probe; disposing the bearing and the sleeve in the cylinder; pushing the shaft and the sleeve axially; pushing, with the sleeve, the bearings against the cylinder; abutting the lock against the sleeve and the housing; and rotating the arm and the probe around the central axis of the cylinder.

The disclosure herein includes a measuring assembly for measuring one or more dimensions of a pipe that has an inner surface and an outer surface, which measuring assembly may include: a housing capable of being disposed at least in part inside the pipe, the housing having an inner housing space and a housing wall; a first bearing, a second bearing, and a third bearing disposed at least in part in the housing wall; and a cylindrical sleeve disposed in the inner housing space, wherein the cylindrical sleeve may have a narrow portion capable of receiving portions of the first bearing, the second bearing, and the third bearing; and a probe rotatably coupled to the housing, wherein the probe may be capable of providing one or more dimensions of the pipe.

DETAILED DESCRIPTION

1. Introduction

Figure 1A:
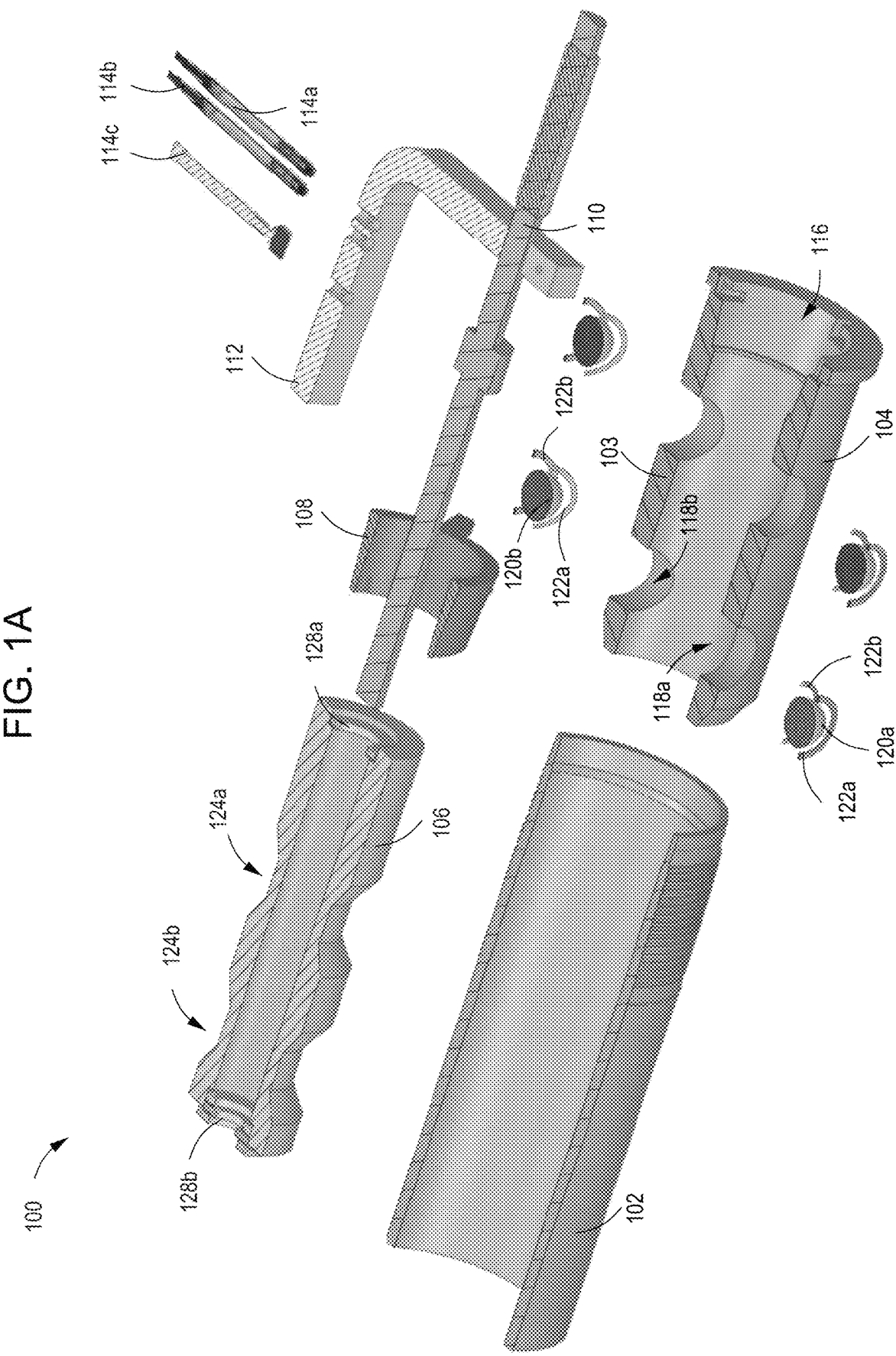
FIG. 1A illustrates a perspective cross-sectional exploded view of a measuring assembly.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references herein to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain claims include one or more of the following terms which, as used herein, are expressly defined below.

The term "adjacent" as used herein means next to and may include physical contact but does not require physical contact.

The term "abut against" as used herein as a verb is defined as position adjacent to and either physically touch or press against, directly or indirectly. After any abutting takes place with one object relative to another object, the objects may be fully or partially "abutted." A first object may be abutted against a second object such that the second object is limited from moving in a direction of the first object. For example, a centralizer may be abutted against a surface of a lock sleeve. The centralizer may also be abutted against a surface of a tubular.

The term "aligning" as used herein is a verb that means manufacturing, forming, adjusting, or arranging one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. Additionally, apertures may be aligned, such that a structure or portion of a structure may be extended into and/or through the apertures.

The term "aperture" as used herein is defined as any opening in a solid object including a structure such as a housing, lock sleeve, lock, arm, pipe, or other tubular. For example, an aperture may be a three-dimensional opening that begins on one side of a solid object and ends on the other side of the object, e.g., the space inside a cylindrical housing, or an aperture passing through a housing wall in which is disposed a bearing. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., housing, lock sleeve, lock, shaft, or bearing.

The term "assembly" as used herein is defined as any set of components that have been fully or partially assembled together. A group of assemblies may be coupled to form a larger assembly.

The term "bearing" as used herein as a noun is defined as any structure that provides support. One such bearing depicted in the drawings herein is a ball bearing, i.e., a bearing that is spherical in shape and is positioned in the wall of a cylindrical housing, i.e., in an aperture in the wall. The ball bearing supports the housing and may also support other structures abutting the bearing, such as a pipe into which the housing is disposed and also a lock sleeve against which the bearing abuts. As depicted in the drawings herein, a bearing may be coupled to an inner surface of a lock sleeve, and a shaft may be rotatably coupled to a bearing. A bearing may be disposed concentrically around a shaft. A bearing may be disposed at each end of a shaft. Multiple bearings, e.g., three or more, arranged concentrically in the wall of a cylindrical housing as depicted in certain drawings herein may function as a "centralizer" when they cause the housing and other structures inside the housing to be biased toward the axial center of the pipe or other tubular being measured. A bearing may be disposed in a housing. A bearing may be disposed on a surface of a housing. A bearing may be configured, sized, and/or shaped for being abutting against a lock sleeve and/or a tubular. A bearing may be configured, sized, and/or shaped for being abutting against a housing and/or a tubular. A bearing may be spherical. A bearing may be a spherical cap. A bearing may be elongated. A bearing may be rib. A plurality of bearing may be used to align a measuring assembly and a tubular on a central axis.

The term "coupled" as used herein is defined as directly or indirectly connected or attached. A first object may be coupled to a second object such that the first object is positioned at a specific location and orientation with respect to the second object. For example, a motor may be coupled to a cutter assembly. A first object may be either permanently, removably, slidably, threadably, pivotably, anti-rotatably, and/or fixedly coupled to a second object. Two objects are "permanently coupled" if once they are coupled, the two objects, in some cases, cannot be separated. Two objects may be "removably coupled" to each other via shear pins, threads, tape, latches, hooks, fasteners, locks, male and female connectors, clips, clamps, knots, and/or surface-to-surface contact. For example, a lock sleeve and a housing may be removably coupled to each other such that the lock may then be uncoupled and removed from the housing. Two objects may be "slidably coupled" where an inner aperture of one object is capable of receiving a second object. For example, a lock sleeve extended through a collar of a housing may be slidably coupled to the housing. Additionally, two objects may be capable of being "threadably coupled," e.g., where a threaded outer surface of one object is capable of being engaged with or to a threaded inner surface of another object. Threadably coupled objects may be removably coupled. Two objects may be "anti-rotatably coupled," e.g., where the first object may be inhibited from being rotated relative to the second object. For example, a measuring assembly may be anti-rotatably coupled to a tubular where the measuring assembly, in some cases, may not be rotated relative to the tubular. Anti-rotatably coupled objects may, in some cases, still be moved axially relative to each other. Two objects may be "fixedly coupled," e.g., where the first object may be inhibited from being rotated and/or moved axially relative to the second object. For example, a lock may be fixedly coupled to a housing and/or a lock sleeve where the lock, in some cases, may neither be rotated nor moved axially relative to the housing and/or the lock sleeve.

The term "cylindrical" as used herein is defined as shaped like a cylinder, e.g., having straight parallel sides and a circular or oval or elliptical cross-section. Examples of a cylindrical structure or object may include a housing, a lock sleeve, a lock, a shaft, bearings, and a tubular. A cylindrical object may be completely or partially shaped like a cylinder. For example, a cylindrical object may have an aperture that is extended through the entire length of the housing may form a hollow cylinder capable of permitting another object, e.g., lock sleeve, lock, shaft, and/or bearings, to be disposed therein and/or extended through. Alternatively, a solid cylindrical object may have an inner surface and/or outer surface having a diameter that changes abruptly. A cylindrical object may have and inner or outer surface having a diameter that changes abruptly to form a collar, e.g., radial face, rim, or lip. A cylindrical object may have a collar extending toward or away from the central axis of the object. A cylindrical object may have a collar disposed on an inner surface. A cylindrical object may have a collar disposed on an outer surface. Additionally, a cylindrical object may be an object having a collar that is tapered or radiused, or a pipe with threads.

The terms "first" and "second" as used herein merely differentiate two or more things or actions, and do not signify anything else, including order of importance, sequence, etc.

The term "housing" as used herein is defined as any fully solid or partially solid structure that can fit partially or fully inside a pipe or other tubular and has walls and space inside with room for some other structure, preferably multiple structures including the lock sleeve and other components as shown in the drawings herein. A housing is preferably cylindrical and capable of being inserted into a pipe or other tubular. A housing may have apertures and it may also have bearings in the walls, e.g., in the apertures. A housing may be capable of receiving a lock sleeve, a lock, and/or a shaft. A housing may be an assembly of two or more housings coupled together.

The term "lock sleeve" as used herein is defined as a fully solid or partially solid sleeve structure that can fit partially or fully inside a housing that is disposed inside a pipe or other tubular and can be coupled to a lock as exemplified in the drawings herein. A lock sleeve may be capable of receiving a shaft and/or a bearing. A lock sleeve may have an inner surface that defines an aperture disposed therethrough. A lock sleeve may be anti-rotatably coupled to a housing such that the lock sleeve, in some cases, cannot be rotated relative to the housing. A lock sleeve may be fixedly coupled to a housing such that the lock sleeve, in some cases, cannot be moved relative to the housing.

The term "lock" as used herein is defined as a structure configured, sized, and/or shaped for being at least partially disposed circumferentially around a lock sleeve and is capable of coupling two or more objects together. For example, a lock may be used to couple a housing to a lock sleeve. Types of locks may include a lug, a steel ball, a slip, a dog, a collect, a ring, and a sleeve. A lock may inhibit movement of a first object in one or more directions, e.g., radially and/or axially. A lock may have pins disposed in lock grooves, e.g., J-grooves, of one or more objects, e.g., housing and/or lock sleeve. A lock may be position concentrically with an object, e.g., housing and/or lock sleeve. A lock may be a disposed on an outer surface of an object, e.g., lock sleeve. A lock may be a ring disposed against an inner surface of an object, e.g., housing. A lock may have a surface abutted against an object. A lock may have a first portion abutted against a surface of a first object and a second portion abutted against a surface of a second object. For example, a lock may have a first portion abutted against a surface of a housing and a second portion abutted against a surface of a lock sleeve.

The term "perpendicular" as used herein is defined as at an angle ranging from 85° or 88 to 92° or 95°. Two structures that are perpendicular to each other may be orthogonal and/or tangential to each other.

The term "pin" as used herein is defined as structure configured, sized, and/or shaped for disposing in an aperture or groove of another structure, e.g., for coupling two objects or inhibiting movement of an object. A pin may also be referred to as a lug. A pin may be cylindrical and may have a tapered end. A pin may be a knob. A pin may be cylindrical. A pin may protrude from a surface of a lock. A pin may be disposed in a J-groove of a housing. A pin may be used to couple a lock to a housing.

The term "pressure" as used herein is defined as any force applied to a structure or other object and can be expressed quantitatively or comparatively in terms of force per unit area. Pressure may be exerted against a surface of an object, e.g., housing, lock sleeve, lock, shaft, bearing, and/or centralizer.

The term "probe" as used herein as a noun is defined as a device for measuring one or more physical attributes of an object. The attributes may include length, height, depth, thickness, incline, and thread space. An example of a conventional probe that can be used for measuring objects described herein can be found in U.S. Pat. No. 10,415,949, which includes a schematic diagram identified therein as FIG. 2, which schematic diagram is hereby incorporated by reference. In addition, a description of the various parts of the schematic diagram of FIG. 2 can be found in the '949 patent, specifically starting on column 3 at line 66 through column 8 at line 30 of that patent, and the contents of those paragraphs are also incorporated herein by reference.

The term "providing" as used herein is defined as making available, furnishing, supplying, equipping, or causing to be placed in position.

The term "surface" as used herein is defined as any face and/or boundary of a structure. A surface may also refer to that flat or substantially flat area that is extended across a flat structure which may, for example, be part of a plate and an arm. A surface may also refer to any curved area that extends circumferentially around a cylindrical structure or object which may, for example, be part of a housing, a lock sleeve, a lock, a shaft, a bearing, and/or a tubular. A surface may have irregular contours. A surface may be formed from coupled components, e.g. a housing, a lock sleeve, a lock, a shaft, a bearing, and/or a tubular. Coupled components may form irregular surfaces. A plurality of surfaces may be connected to form a polygonal cross-section. An example of a polygonal cross-section may be triangular, square, rectangular, pentagonal, hexagonal, or octagonal. Socket surfaces may have socket surfaces connected to form a polygonal shape, e.g., triangular, square, rectangular, pentagonal, hexagonal, or octagonal. Socket surfaces may have curved walls connected to form a substantially polygonal shape, e.g., triangular, square, rectangular, pentagonal, hexagonal, or octagonal.

The term "tapered" as used herein is defined as becoming progressively smaller, e.g., in diameter, from a first end towards a second end. Structures that are tapered may have a profile or surface that is beveled, frustoconical, and/or conical.

The term "threaded" as used herein is defined as having threads. Threads may include one or more helical protrusions or grooves on a surface of a cylindrical object. Each full rotation of a protrusion or groove around a threaded surface of the object is referred to herein as a single "thread." Threads may be disposed on any cylindrical structure or object including a housing, a lock sleeve, a lock, a shaft, a bearing, and/or a tubular. Threads formed on an inner surface of an object, e.g., tubular, may be referred to as "box threads". Threads formed on an outer surface of an object, e.g., tubular, may be referred to as "pin threads." A tubular may include a "threaded portion" wherein a section of the threaded assembly includes threads, e.g., pin threads or box threads. A threaded portion may have a diameter sized to extend through an aperture of a sleeve, a housing, or a collar. In certain cases, a threaded portion of a first object may be removably coupled to a threaded portion of a second object.

The term "tubular" as used herein is defined as a cylindrical structure having an inner surface and an outer surface, a wall, a length greater than its width or height, two opposing ends and an opening at one or both of the ends. A tubular may have an aperture disposed therethrough. Preferably, a tubular is cylindrical. Examples of a tubular may include a pipe, a housing, a lock sleeve, and a lock. However, any or all tubulars of an assembly may have polygonal cross-sections, e.g., triangular, rectangular, pentagonal, hexagonal, or octagonal.

The term "unitary" as used herein defined as having the form of a single unit.

The terms "upper," "lower," "top," "bottom" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a housing, a lock sleeve, a lock, a shaft, a bearing, and/or a tubular may each have an upper end and a lower end. Additionally, a cylindrical object, e.g., a housing, a lock sleeve, a lock, a shaft, a bearing, and/or a tubular, may have an upper portion and a lower portion. The term "top" as used herein means in the highest position, e.g., farthest from the ground. The term "bottom" as used herein means in the lowest position, e.g., closest the ground. For example, a cylindrical object, e.g., a housing, a lock sleeve, a lock, a shaft, a bearing, and/or a tubular, may have a top portion and a bottom portion.

3. Certain Specific Embodiments

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space and a housing wall with an inner housing surface and an outer housing surface; a bearing disposed in the housing wall; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space; a sleeve disposed in the inner housing space; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a housing capable of being disposed at least in part inside the pipe, the cylindrical housing having an inner housing space; a sleeve disposed in the inner housing space; a lock capable of inhibiting movement of the sleeve; and a probe rotatably coupled to the housing, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space and a housing wall with an inner housing surface and an outer housing surface; a bearing disposed in the housing wall; a rotatable shaft disposed in the inner housing space; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing space; a sleeve disposed in the inner housing space; a shaft rotatably coupled to the sleeve; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a housing capable of being disposed at least in part inside the pipe, the cylindrical housing having an inner housing space; a sleeve disposed in the inner housing space; a lock capable of inhibiting movement of the sleeve; a shaft rotatably coupled to the sleeve; an arm coupled to the shaft; and a probe coupled to the arm, wherein the probe is capable of providing one or more dimensions of the pipe.

The disclosure herein includes a measuring assembly for measuring one or more dimensions of a pipe that has an inner surface and an outer surface, which measuring assembly may include: a housing having a housing aperture and an outer housing surface; a first bearing and a second bearing, wherein the first bearing and the second bearing may extend through the outer housing surface; a sleeve disposed in the housing aperture, wherein the sleeve may be capable of pushing the first bearing and the second bearing against the cylinder; a lock capable of inhibiting movement of the sleeve; a shaft rotatably coupled to the sleeve; an arm coupled to the shaft; and a probe coupled to the arm.

The disclosure herein includes a measuring assembly for measuring one or more dimensions of a pipe that has an inner surface and an outer surface, which measuring assembly may include: a cylindrical housing capable of being disposed at least in part inside the pipe, the cylindrical housing having an inner housing surface and an outer housing surface; a bearing disposed in the housing; a rotatable shaft in the housing; a first arm coupled to the shaft; a first probe coupled to the first arm, wherein the first probe is capable of providing one or more outer dimensions of the pipe; a second arm coupled to the shaft; and a second probe coupled to the second arm, wherein the second probe is capable of providing one or more inner dimensions of the pipe.

The disclosure herein includes a measuring assembly for measuring one or more dimensions of a pipe that has an inner surface and an outer surface, which measuring assembly may include: a housing capable of being disposed at least in part inside the pipe, the housing having an inner housing space and a housing wall; a first bearing, a second bearing, and a third bearing disposed at least in part in the housing wall; and a cylindrical sleeve disposed in the inner housing space, wherein the cylindrical sleeve may have a narrow portion capable of receiving portions of the first bearing, the second bearing, and the third bearing; and a probe rotatably coupled to the housing, wherein the probe may be capable of providing one or more dimensions of the pipe.

The disclosure herein includes a method of measuring one or more dimensions of a pipe that has an inner surface and an outer surface, which method may include: providing measuring assembly that may include: a housing; a bearing extending through the housing; a shaft rotatably coupled to the housing; an arm rotatably coupled to the shaft; and a probe; disposing a portion of the housing and the bearing in the cylinder; pushing the bearing against the cylinder; and rotating the arm and the probe around the central axis of the cylinder.

The disclosure herein includes a method of measuring one or more dimensions of a pipe that has an inner surface and an outer surface, which method may include: providing measuring assembly that may include: a housing; bearings extending through the housing; a sleeve slidably coupled to the housing; a lock capable of inhibiting movement of the sleeve; a shaft rotatably coupled to the sleeve; an arm rotatably coupled to the shaft; and a probe; disposing the bearing and the sleeve in the cylinder; pushing the shaft and the sleeve axially; pushing, with the sleeve, the bearings against the cylinder; abutting the lock against the sleeve and the housing; and rotating the arm and the probe around the central axis of the cylinder.

In any one of the methods or structures disclosed herein, the sleeve may have a tapered outer surface.

In any one of the methods or structures disclosed herein, the sleeve may have a frustoconical outer surface.

In any one of the methods or structures disclosed herein, the sleeve may include a portion capable being abutted against the bearing.

In any one of the methods or structures disclosed herein, the sleeve may have a narrow portion capable of receiving a portion of the bearing.

In any one of the methods or structures disclosed herein, the sleeve may have a plurality of portions including a narrow portion having a diameter less than any diameter of any other portion of the sleeve.

In any one of the methods or structures disclosed herein, the bearing may be capable of being abutted against the cylinder.

In any one of the methods or structures disclosed herein, the lock may have a tapered outer surface.

In any one of the methods or structures disclosed herein, the lock may be disposed between the housing and the sleeve.

In any one of the methods or structures disclosed herein, the lock may have collapsible fingers.

In any one of the methods or structures disclosed herein, the lock may have collapsible fingers capable of being abutted against the sleeve.

In any one of the methods or structures disclosed herein, the first bearing and the second bearing may be spherical.

In any one of the methods or structures disclosed herein, the sleeve may have a first lock portion capable being abutted against the first bearing.

In any one of the methods or structures disclosed herein, the sleeve may have a second lock portion capable being abutted against the second bearing.

In any one of the methods or structures disclosed herein, the sleeve may have a lock portion capable being abutted against a first bearing.

In any one of the methods or structures disclosed herein, the sleeve may have a lock portion capable being abutted against a plurality of bearings.

In any one of the methods or structures disclosed herein, the sleeve may have a plurality of narrow portions including: a first narrow portion capable of receiving a portion of the first bearing; and a second narrow portion capable of receiving a portion of the second bearing.

In any one of the methods or structures disclosed herein, the sleeve may have a plurality of portions including: a first narrow portion capable of receiving a portion of the first bearing; and a second narrow portion capable of receiving a portion of the second bearing.

Any one of the methods or structures disclosed herein may further include abutting a pin of the lock against a bearing on the housing.

Any one of the methods or structures disclosed herein may further include pulling, with a key, the lock away from the housing.

Any one of the methods or structures disclosed herein may further include pushing, with a key, the lock against the housing.

Any one of the methods or structures disclosed herein may further include: measuring the outer surface of the with a first probe; and measuring the inner surface of the cylinder with a second probe.

Any one of the methods or structures disclosed herein may further include abutting a portion of a probe against an inner surface of the cylinder.

Any one of the methods or structures disclosed herein may further include abutting a portion of a probe against an outer surface of the cylinder.

4. Specific Embodiments in the Drawings

The drawings presented herein are for illustrative purposes only and do not limit the scope of the claims. Rather, the drawings are intended to help enable one having ordinary skill in the art to make and use the claimed inventions.

This section addresses specific versions of measuring assemblies shown in the drawings, which relate to assemblies, elements and parts that can be part of a measuring assembly, and methods for measuring certain dimensions of cylindrical objects, e.g., including drill pipes, casing, production pipes, and/or other tubulars. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

Figure 1B:
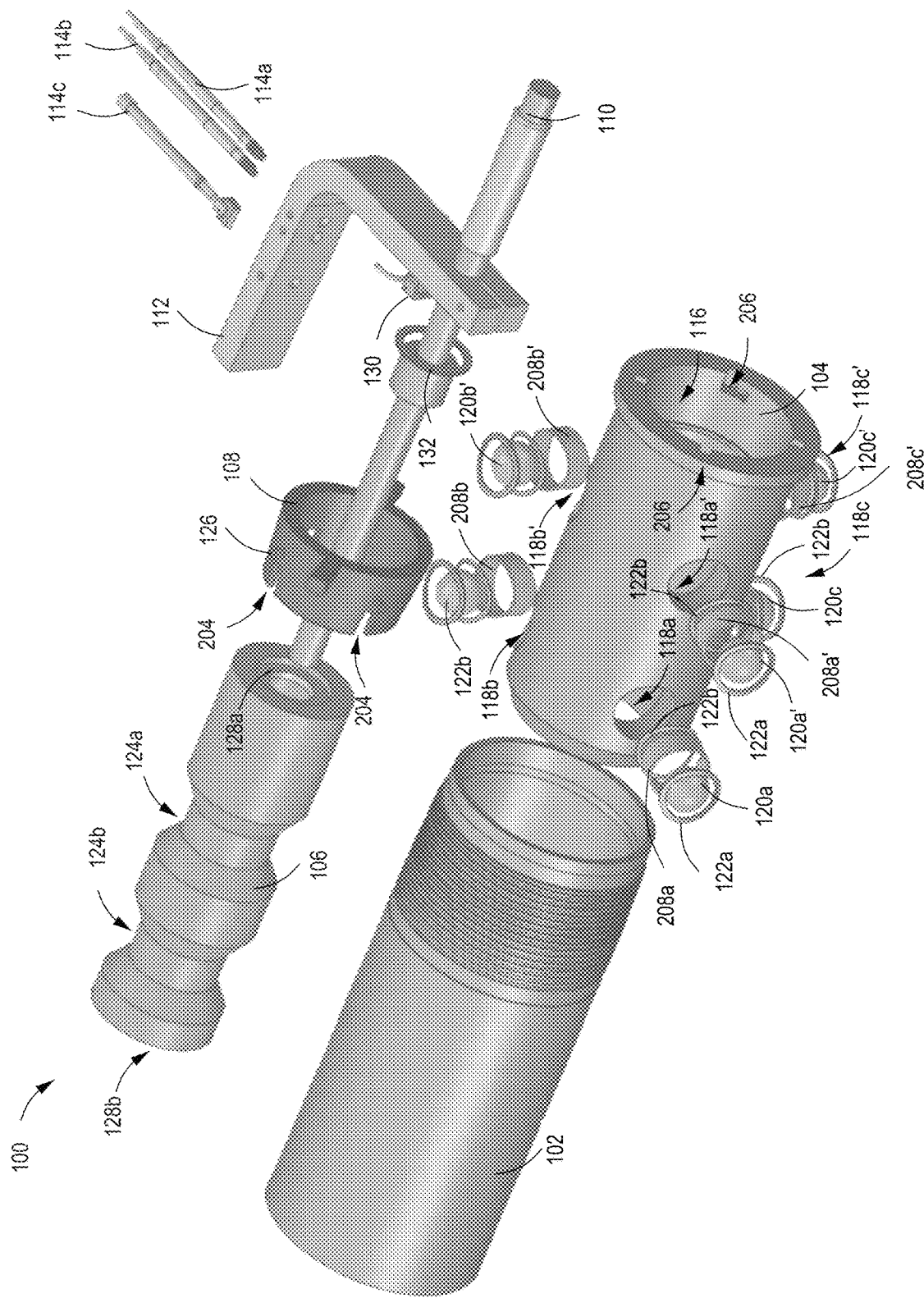
FIG. 1B illustrates a perspective exploded view of a measuring assembly.

FIG. 1A illustrates a perspective cross-sectional exploded view of a particular measuring assembly 100. FIG. 1B illustrates a perspective exploded cross-sectional view of the measuring assembly 100. The measuring assembly 100 is sized so that at least a portion of it can be placed on the inside of a pipe 102 with threads, including any type of tubular but preferably an oilfield tubular that has a threaded portion. Thus, for example, the pipe 102 depicted in FIG. 1 may be a tubular that is part of a tubular string that can be disposed in a wellbore, including, for example, a pipe that is part of a drill string or casing string, as well as a liner hanger, a sub, a running tool, and/or a fishing tool with a threaded portion.

Referring to FIGS. 1A-B, this particular measuring assembly 100 includes housing 104, a lock sleeve 106, a lock 108, a shaft 110, an arm 112, and probes 114a-c. As a point of clarification, the measuring assembly 100 does not include the pipe 102, which is the piece being measured by the measuring assembly 100. This housing 104 is cylindrical. The housing 104 has an aperture 116 extending therethrough, i.e., the opening defined by the inner surface of the cylindrical wall of the housing 104. Accordingly, the housing 104 has an outer surface and an inner surface, which in assembly 100 defines the housing wall. Additionally, the housing 104 has small radially extending apertures 118a-c disposed in the housing wall, which apertures extend radially from the outer surface to the inner surface, intersecting the axially oriented aperture 116. Bearings 120a-c, which are spherical in shape and can be conventional ball bearings, are positioned in the housing wall, and specifically are in the apertures 118a-c, respectively. The diameters of the apertures 118a-c are greater than those of the ball bearings 120a-c, and the diameters of the ball bearings are greater than the thickness of the housing wall, i.e., the distance from the outer housing surface to the inner housing surface. Thus, each of the bearings 120a-c is capable of being moved radially along the central axes of the apertures 118a-c, respectively. In other words, the bearings 120a-c are movable in a direction perpendicular to the central axis of the housing 104, toward the central axis or away from the central axis.

Preferably, the thickness of the housing wall 103 where the apertures 118a-c are disposed is less than the diameters of the bearings 120a-c. In that way, each of the bearings 120a-c has a portion extending through at least one, and preferably both, of the inner surface and the outer surface of the housing 104 (see FIG. 2B).

In the measuring assembly 100, each bearing 120 is retained in its respective aperture 118 with inner and outer retaining rings 122a-b that are positioned either inside the aperture where the bearing is, or on the outer surface of the housing in alignment with the aperture. In the latter case, the outer retaining ring 122a is coupled, e.g., via screws (not shown), to the outer surface of the housing 104. The inner retaining ring 122b is coupled, e.g., via screws (not shown), to the inner surface of the housing 104. Each ring has an inner diameter and an outer diameter, and the inner diameter is preferably smaller than the diameter of the aperture on which it is coupled. Thus, during assembling, the ball bearing can be inserted to fit inside the aperture, before the retaining rings are attached to the walls. After the retaining rings are attached, each of the retaining rings 122a-b inhibits the corresponding bearing 120 from egress from its respective aperture 118.

The measuring assembly 100 also can have a lock sleeve 106. When the lock sleeve 106 is inserted down into the housing aperture 116, i.e., axially down through the upper opening defined by the upper rim of the housing 104 and into the inner housing space, it will physically touch and abut against each of the ball bearings 120a-c on their upper hemispheric part, and then as the lock sleeve is pushed further down through the housing aperture 116 in an axial direction and pressure is exerted against the upper hemispheric surface of the ball bearings 120a-c, the force against the ball bearing 120a-c gradually becomes more radial and less axial causing the ball bearings 120a-c to move radially away from the central axis of the housing 104. The ball bearings 120a-c are then pushed radially outward until they abut against the inner surface of the pipe 102, and there is outward radial pressure being exerted via the ball bearings 120a-c from the lock sleeve to the inner surface of the pipe. Thus, the lock sleeve 106 can be disposed in the housing aperture 116 (i.e., open space) of the housing 104. The lock sleeve 106 has an outer surface and an inner surface. Preferably during a measuring operation, the outer surface of the lock sleeve is abutted against the bearings 120a-c as described above. When the measuring assembly is not in use, or any other time it is not desired for the ball bearings 120a-c to be abutted against the inside surface of the pipe, the lock sleeve can be adjusted so that its outer surface does not abut against and impose pressure on the bearings. For this, the outer surface of the lock sleeve has grooves 124a-b in which inside portions of the ball bearings 120a-c can be disposed, so that the lock sleeve does not impose outward radial pressure on the ball bearings 120a-c. Preferably, whenever the ball bearings 120a-c are disposed in the grooves 124a-b, the outer surface are not abutted against the ball bearings 120a-c.

Figure 2A:
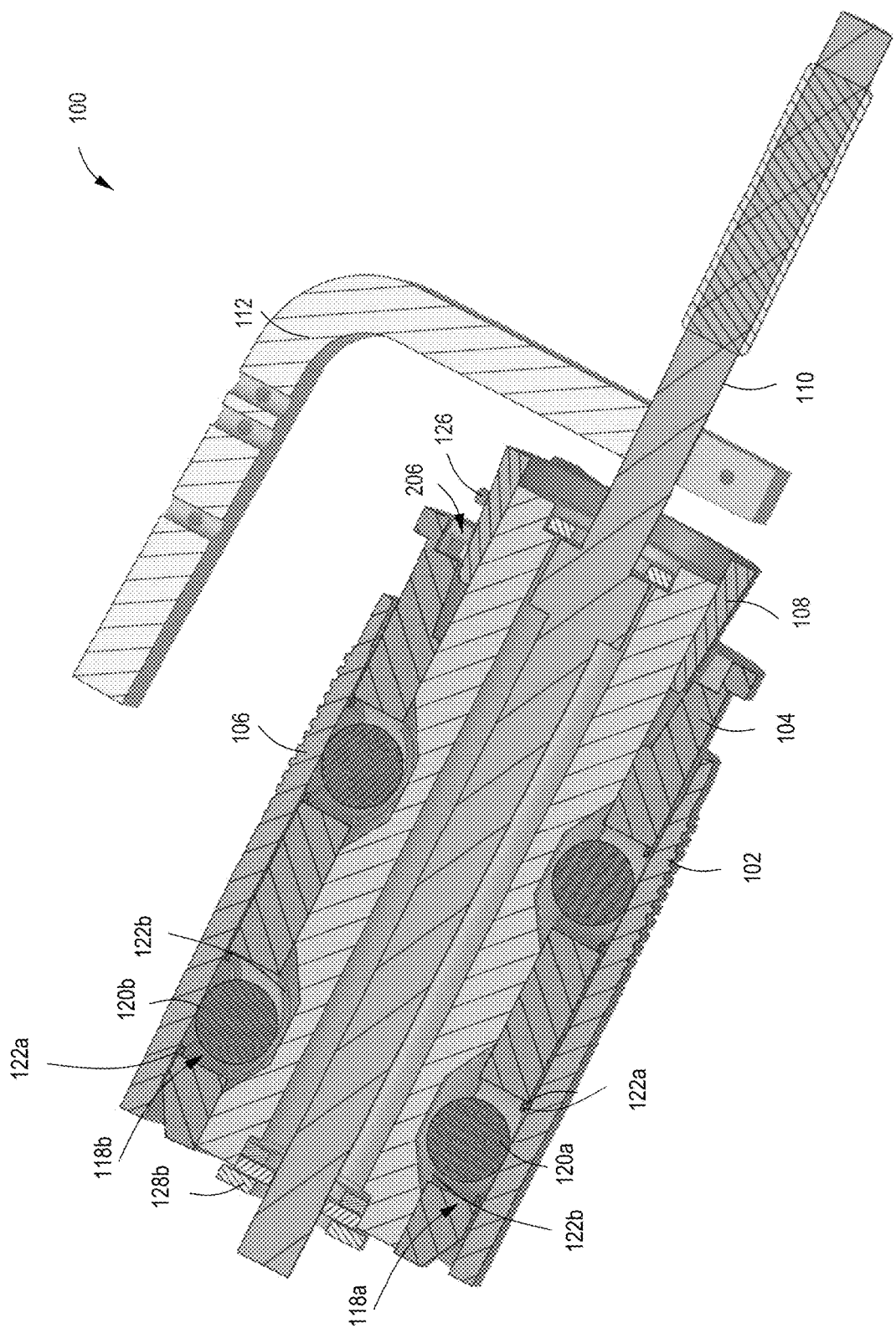
FIG. 2A illustrates a cross-sectional view of a measuring assembly in an unlocked configuration.
Figure 2B:
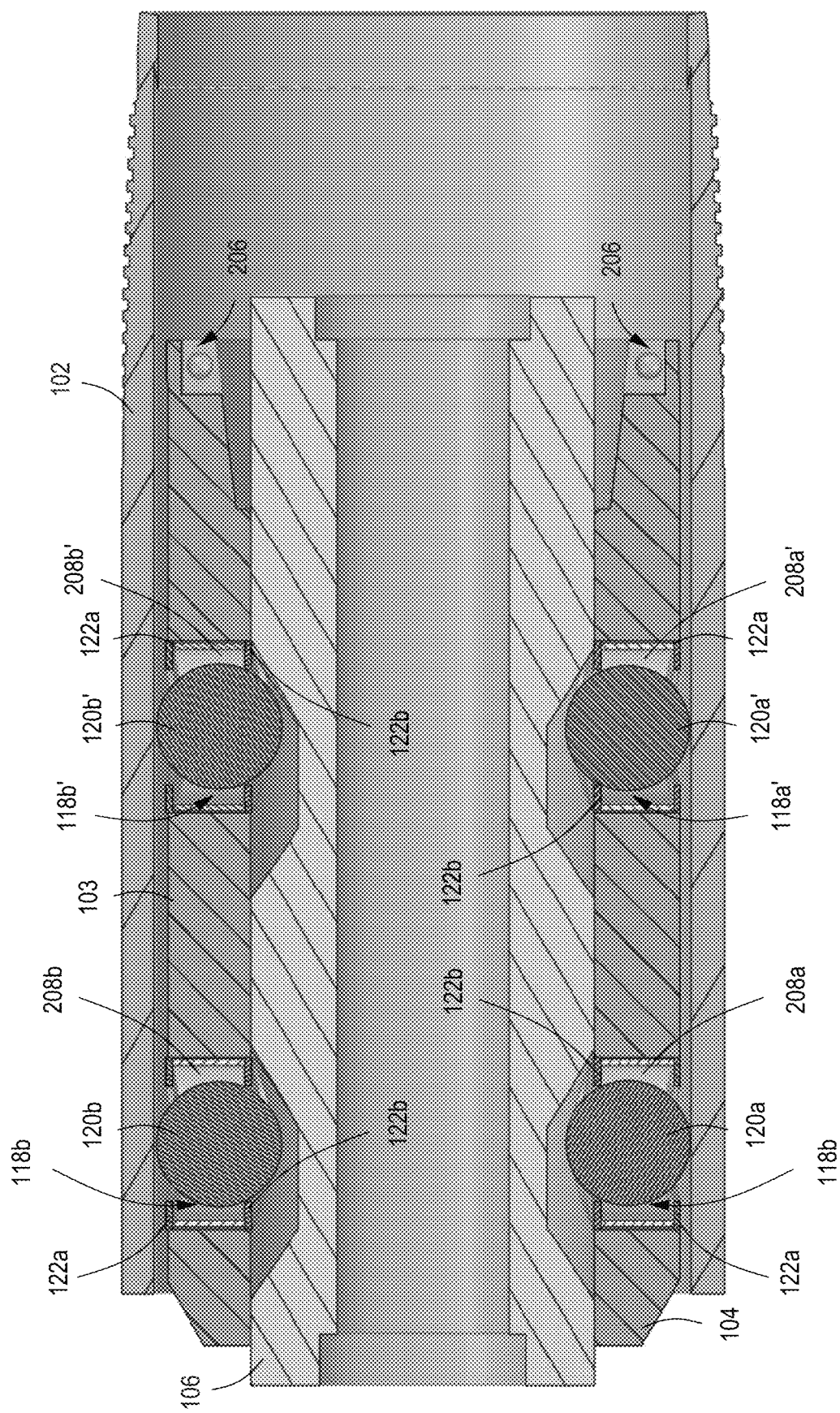
FIG. 2B illustrates a cross-sectional view of a housing having ball bearing disposed therein.

The measuring assembly 100 depicted in the drawings has a lock 108, which can be disposed adjacent to lock sleeve 106 and can be disposed at least partially between lock sleeve 106 and housing 104, as illustrated in FIG. 2A. During assembling of the measuring assembly 100, lock 108 may be slid axially along the lock sleeve 106. Moreover, the lock 108 has an inner surface and an outer surface. The inner surface of the lock 108 may be abutted against the outer surface of the lock sleeve 106. The outer surface of the lock 108 may be abutted against the inner surface of the housing 104. Additionally, pins 126 may extend from the outer surface of the lock 108. The pins 126 may be disposed in the lock grooves 206 in the housing 104.

The measuring assembly 100 depicted in the drawings also has a shaft 110, which is rotatably coupled to lock sleeve 106, as seen in FIG. 2A. The shaft 110 extends through the lock sleeve 106, as well as the pipe 102, the housing 104, and the lock 108. The shaft 110 is rotatably coupled to bearings 128a-b on the lock sleeve 106. The bearing 128a-b are fixedly coupled, e.g., via screws, to the housing 104. Accordingly, in some cases, the bearings 128a-b may inhibit axial movement of the shaft 110 relative to the lock sleeve 106.

The arm 112 is coupled to the shaft 110. The arm 112 has an L-shape. A first portion of the arm 112, may have a pin (not shown) extending therethrough. The pin may be abutted against the arm 112 and the shaft 110. The pin 126 may, in some cases, inhibit movement of the arm 112 relative to the shaft 110.

Also, an encoder 130 is coupled to the first portion of the arm 112. The encoder 130 is a capable of detecting magnetic forced emitted by a magnetic wheel 132. The magnetic wheel 132 may be disposed around the shaft 110. Also, the magnetic wheel 132 may be coupled to the lock sleeve 106. During operation, the encoder 130 may count the number of revolution of the arm 112 in relation to the magnetic wheel 132.

A second portion of the arm 112a has probes 114a-c removably coupled thereto. The probes 114a-c may extend through a portion of the arm 112. When coupled to the arm 112, the probes 114a-c would be perpendicular to the central axis of the housing 104.

FIG. 2A illustrates a cross-sectional view of a measuring assembly 100 in an unlocked configuration. Additionally, the measuring assembly 100 is disposed in a tubular 102. A lock sleeve 106 is disposed within a housing 104. The lock sleeve 106 has outer surfaces 202. The outer surface has grooves 124a-b. Portions of the centralizers 120a-c are disposed in the grooves 124a-b. In some cases, the centralizers 120a-c are not physical contact with the outer surfaces 202. Accordingly, in some cases, the centralizers 120a-c may not be abutted against the tubular 102. The centralizers 120a-c are said to be "floating" in the housing 104.

Additionally, in the unlocked configuration, the lock 108 is position away from the housing 104. The lock 108 is not abutted against the housing 104. Thus, the housing 104 may be freely moved along the tubular 102.

Figure 3A:
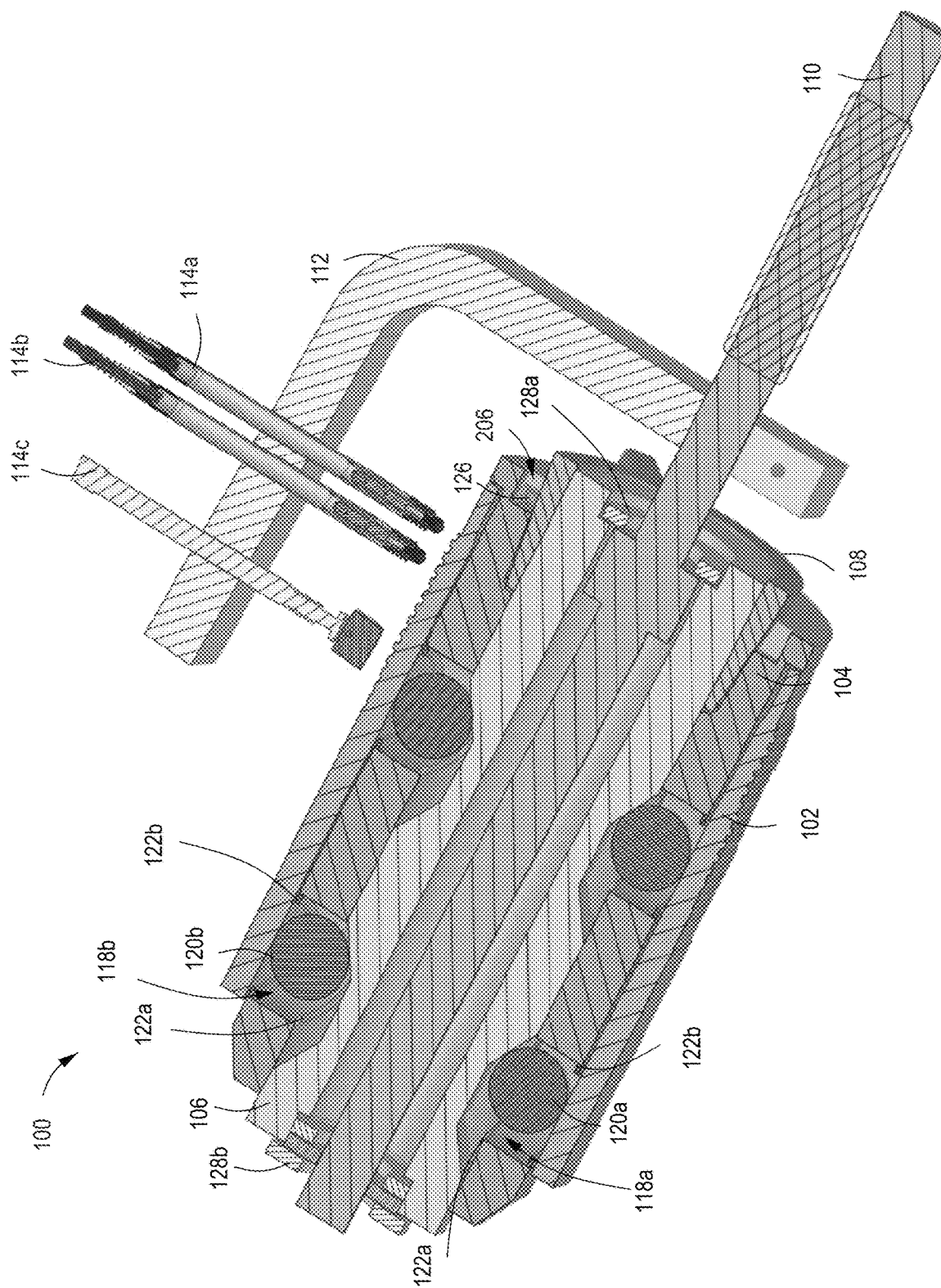
FIG. 3A illustrates a cross-sectional view of a measuring assembly in a locked configuration.
Figure 3B:
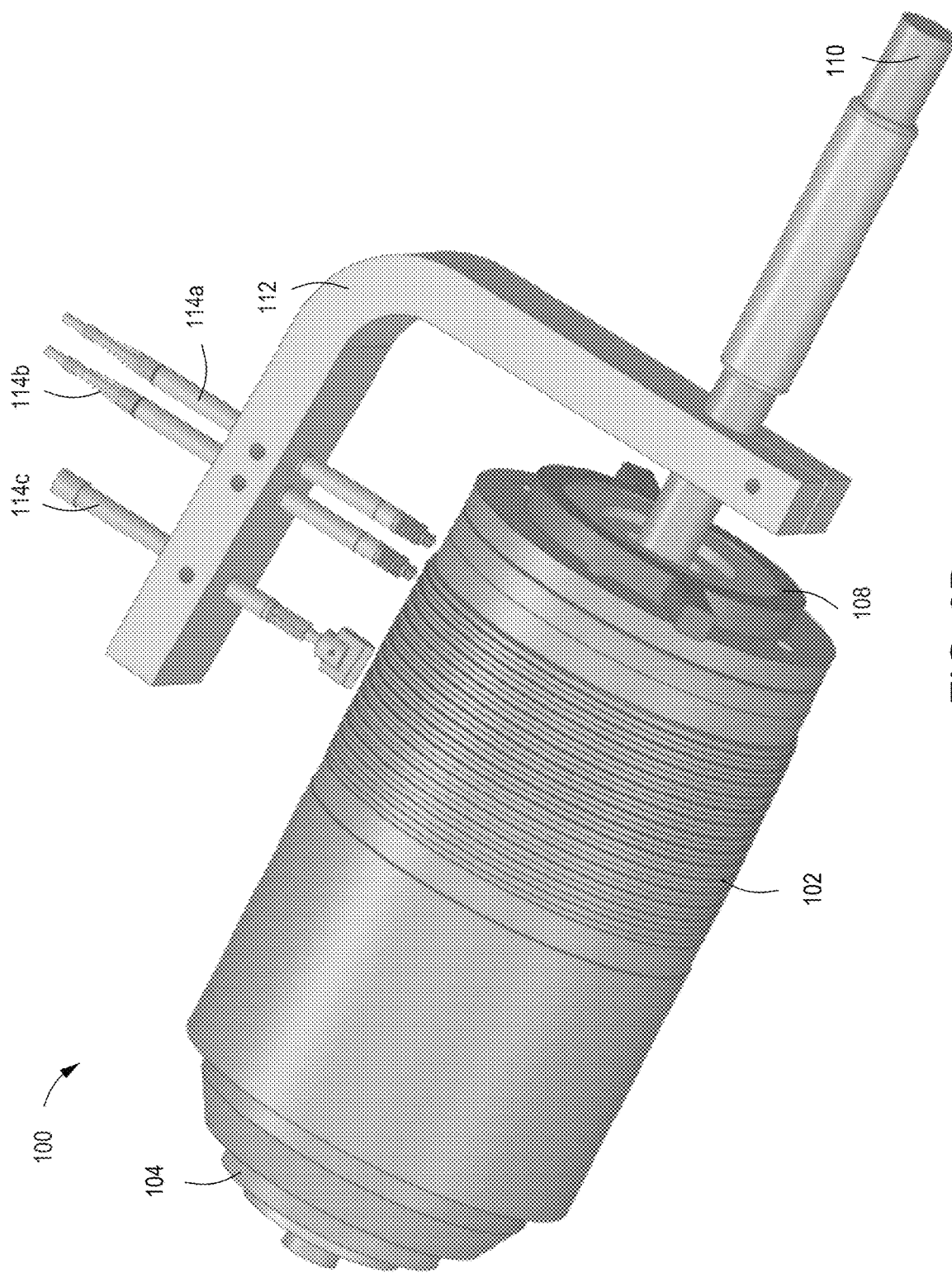
FIG. 3B illustrates a perspective view of a measuring assembly in a locked configuration.

FIG. 3A illustrates a cross-sectional view of a measuring assembly 100 in a locked configuration. FIG. 3B illustrates a perspective view of a measuring assembly 100 in a locked configuration. The measuring assembly 100 is disposed in a tubular 102.

Referring to FIGS. 3A-B, the lock sleeve 106 has outer surfaces 202 abutted against centralizers 120a-c. The lock sleeve 106 may be pushed against the centralizers 120a-c to cause the centralizers 120a-c to be abutted against the tubular 102.

The lock sleeve 106 may be slid to various position in the housing until the tapered surfaces 202 of the lock sleeve 106 are pushed against the centralizers 120a-c. The pushed centralizers 120a-c may be abutted against the tubular 102. For example, if a tubular 102 has a larger radius than that of the tubular 102 in FIG. 2B, the centralizers 120a-c would be abutted against a different portion of the outer surface 202. Moreover, the lock sleeve 106 would be disposed lower down the housing 104 (compared to the housing 104 in the tubular 102 of FIG. 2). Thus, by way of the tapered profiled of the outer surfaces 202, the measuring assembly 100 can accommodate tubulars 102 of varying internal radii.

Additionally, in the locked configuration, the lock 108 is wedged between an inner surface of the housing 104 and an outer surface of the lock sleeve 106. The lock 106 may have slits 204 extending from an end of the lock 108. Any two slits 204 may define a collapsible finger of a lock 108. When wedged between the housing 104 and the lock sleeve 106, collapsible fingers of the lock 108 may be biased against the outer surface of the lock sleeve 106. Accordingly, each collapsible finger has an outer surface abutted against the housing 104 and an inner surface abutted against the lock sleeve 106.

The lock 108 include pins 126 extending from the outer surface of the lock 108. The pins 126 may be disposed in lock grooves 206 of the housing 104. The pins 126 may be abutted against a surface of the housing 104. Accordingly, the lock 108 is inhibited from being rotated or being moved axially.

Thus, in some cases, the lock sleeve 106 may be inhibited from being slid axially and/or rotated because 1) the lock sleeve 106 is abutted against the centralizers 120a-c, 2) the lock 108 is wedged between the housing 104 and the lock sleeve 106, and 3) the pins 126 are abutted against housing 104.

Figure 4:
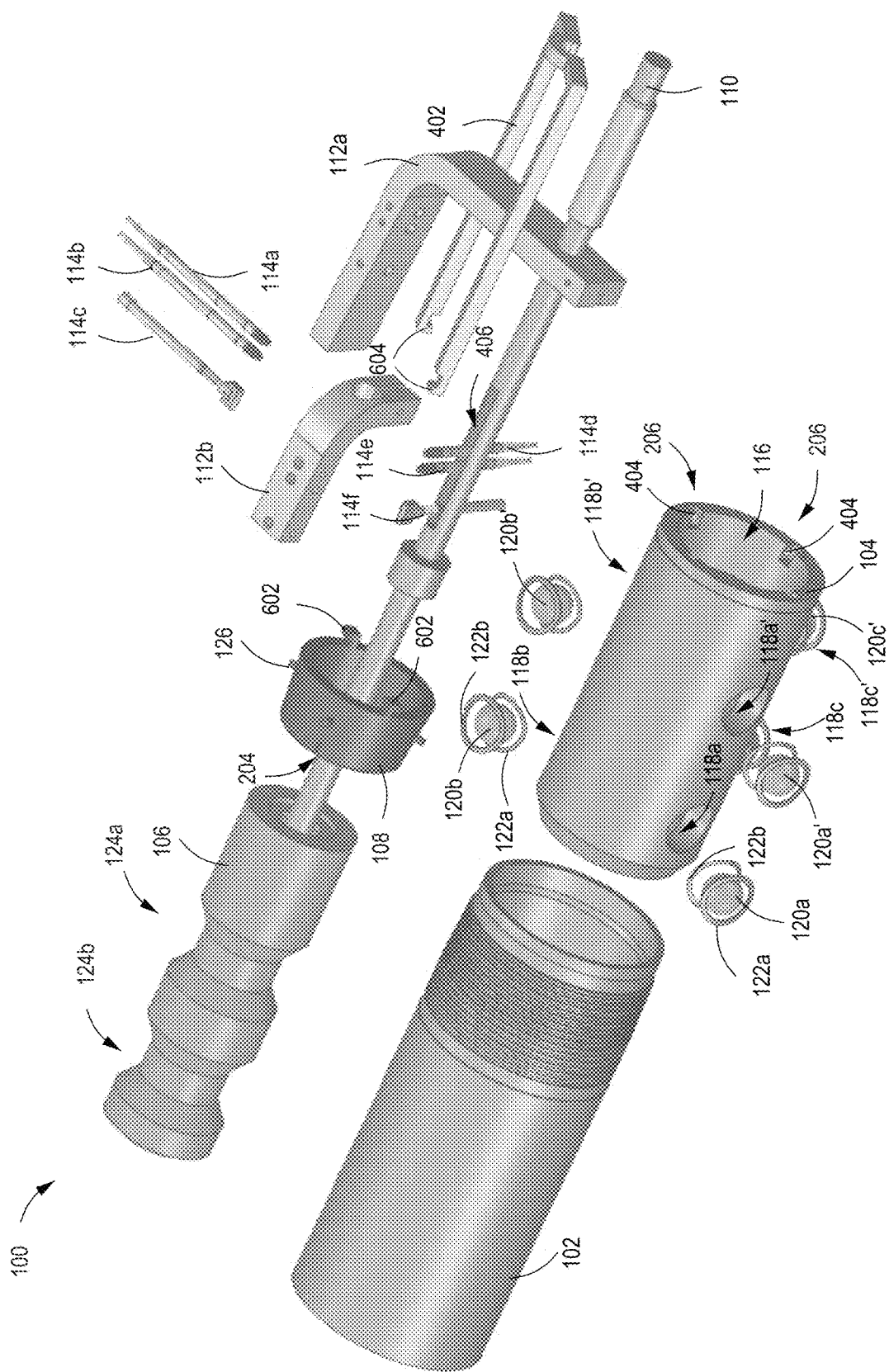
FIG. 4 illustrates a perspective exploded view of a measuring assembly having two arms.
Figure 5:
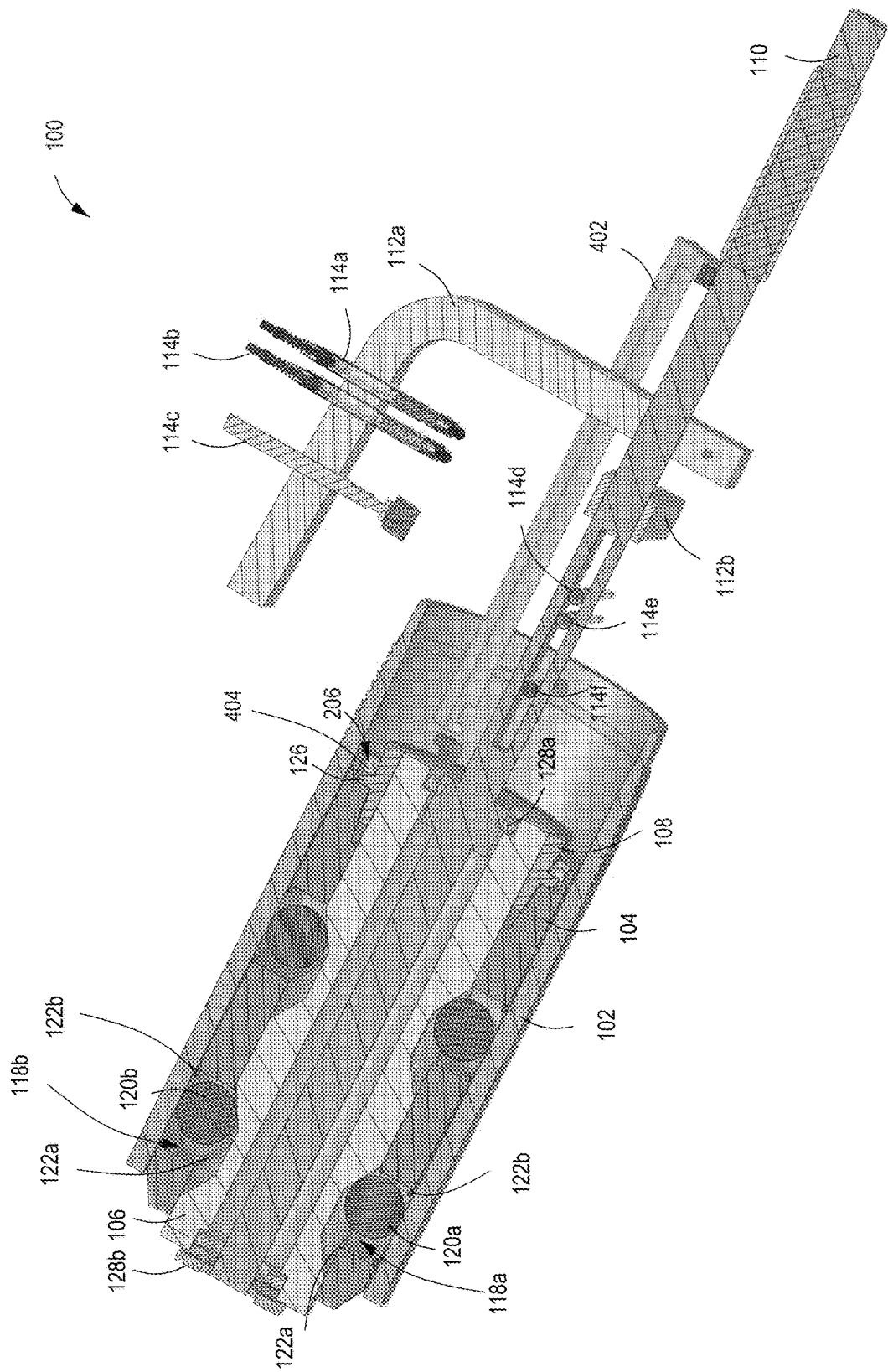
FIG. 5 illustrates a cross-sectional view of a measuring assembly having two arms in a locked configuration.

FIG. 4 illustrates a perspective exploded view of a measuring assembly 100 having two arms 112a, 112b. FIG. 5 illustrates a cross-sectional view of a measuring assembly having two arms in a locked configuration. The measuring assembly 100 is sized so that at least a portion of it can be placed on the inside of a pipe 102 with threads, including any type of tubular but preferably an oilfield tubular that has a threaded portion. Thus, for example, the pipe 102 depicted in FIG. 4 may be a tubular that is part of a tubular string that can be disposed in a wellbore, including, for example, a pipe that is part of a drill string or casing string, as well as a liner hanger, a sub, a running tool, and/or a fishing tool with a threaded portion.

Referring to FIG. 4 and FIG. 5, this particular measuring assembly 100 includes housing 104, a lock sleeve 106, a lock 108, a shaft 110, a first arms 112a, a second arm 112b, probes 114a-f, and a key 402. As a point of clarification, the measuring assembly 100 does not include the pipe 102, which is the piece being measured by the measuring assembly 100. This housing 104 is cylindrical. The housing 104 has an aperture 116 extending therethrough, i.e., the opening defined by the inner surface of the cylindrical wall of the housing 104. Accordingly, the housing 104 has an outer surface and an inner surface, which in assembly 100 defines the housing wall. Additionally, the housing 104 has small radially extending apertures 118*a-c* disposed in the housing wall, which apertures extend radially from the outer surface to the inner surface, intersecting the axially oriented aperture 116. Bearings 120*a-c*, which are spherical in shape and can be conventional ball bearings, are positioned in the housing wall, and specifically are in the apertures 118*a-c*, respectively. The diameters of the apertures 118*a-c* are greater than those of the ball bearings 120*a-c*, and the diameters of the ball bearings are greater than the thickness of the housing wall, i.e., the distance from the outer housing surface to the inner housing surface. Thus, each of the bearings 120*a-c* is capable of being moved radially along the central axes of the apertures 118*a-c*, respectively. In other words, the bearings 120*a-c* are movable in a direction perpendicular to the central axis of the housing 104, toward the central axis or away from the central axis.

Preferably, the thickness of the housing wall 103 where the apertures 118*a-c* are disposed is less than the diameters of the bearings 120*a-c*. In that way, each of the bearings 120*a-c* has a portion extending through at least one, and preferably both, of the inner surface and the outer surface of the housing 104 (see FIG. 2B).

In the measuring assembly 100, each bearing 120 is retained in its respective aperture 118 with inner and outer retaining rings 122*a-b* that are positioned either inside the aperture where the bearing is, or on the outer surface of the housing in alignment with the aperture. In the latter case, the outer retaining ring 122*a* is coupled, e.g., via screws (not shown), to an outer surface of a cylinder 208*a* (see FIG. 2B). The inner retaining ring 122*b* is coupled, e.g., via screws (not shown), to an inner surface of the cylinder 208*a* (see FIG. 2B). Each ring has an inner diameter and an outer diameter, and the inner diameter is preferably smaller than the diameter of the aperture on which it is coupled. Thus, during assembling, the ball bearing 120 can be inserted to fit inside the aperture, before the retaining rings are attached to the walls. After the retaining rings are attached, each of the retaining rings 122*a-b* inhibits the corresponding bearing 120 from egress from its respective aperture 118.

Additionally, the housing wall 103 has lock grooves 206 disposed therein. Ball bearings 404 are disposed in the lock grooves 206. Each ball bearing 404 is retained in a respective aperture (not shown) disposed in the housing wall 103. Each bearing 404 is retained in its respective aperture with outer retaining rings (not shown) that are coupled to the housing wall 103. A spring (not shown), e.g., coil, is disposed between each bearing 404 and a surface of the housing wall 103. Accordingly, each bearing 404 is biased away from the surface of the housing wall 103.

The measuring assembly 100 also can have a lock sleeve 106. When the lock sleeve 106 is inserted down into the housing aperture 116, i.e., axially down through the upper opening defined by the upper rim of the housing 104 and into the inner housing space, it will physically touch and abut against each of the ball bearings 120*a-c* on their upper hemispheric part, and then as the lock sleeve 106 is pushed further down through the housing aperture 116 in an axial direction and pressure is exerted against the upper hemispheric surface of the ball bearings 120*a-c*, the force against the ball bearing 120*a-c* gradually becomes more radial and less axial causing the ball bearings 120*a-c* to move radially away from the central axis of the housing 104. The ball bearings 120*a-c* are then pushed radially outward until they abut against the inner surface of the pipe 102, and there is outward radial pressure being exerted via the ball bearings 120*a-c* from the lock sleeve 106 to the inner surface of the pipe. Thus, the lock sleeve 106 can be disposed in the aperture 116 (i.e., open space) of the housing 104. The lock sleeve 106 has an outer surface and an inner surface. Preferably during a measuring operation, the outer surface of the lock sleeve 106 is abutted against the bearings 120*a-c* as described above. When the measuring assembly 100 is not in use, or any other time it is not desired for the ball bearings 120*a-c* to be abutted against the inside surface of the pipe, the lock sleeve can be adjusted so that its outer surface does not abut against and impose pressure on the bearings. For this, the outer surface of the lock sleeve 106 has grooves 124*a-b* in which inside portions of the ball bearings 120*a-c* can be disposed, so that the lock sleeve 106 does not impose outward radial pressure on the ball bearings 120*a-c*. Preferably, whenever the ball bearings 120*a-c* are disposed in the grooves 124*a-b*, the outer surface are not abutted against the ball bearings 120*a-c*.

The measuring assembly 100 depicted in the drawings has a lock 108, which can be disposed adjacent to lock sleeve 106 and can be disposed at least partially between lock sleeve 106 and housing 104, as illustrated in FIG. 2. During assembling of the measuring assembly 100, lock 108 may be slid axially along the lock sleeve 106. Moreover, the lock 108 has an inner surface and an outer surface. The inner surface of the lock 108 may be abutted against the outer surface of the lock sleeve 106. The outer surface of the lock 108 may be abutted against the inner surface of the housing 104.

Additionally, pins 126 may extend from the outer surface of the lock 108. The pins 126 may be disposed in the lock grooves 206 in the housing 104. In the locked configuration, the pins 126 are abutted against ball bearings 404. In some cases, the pins 404 inhibit the lock 108 from axial movement relative to either the housing 104 and/or the lock sleeve 106.

Ball bearings 404 are disposed in the lock grooves 206. In the housing 104, each bearing 404 is retained in a respective apertures (not shown) disposed in the housing 104. Each bearing 404 is retained in its respective aperture with outer retaining rings (not shown) that are coupled to the housing 104. A spring (not shown), e.g., coil, is disposed between each bearing 404 and surfaces of the housing 104. Accordingly, each bearing 404 is biased away from the surface of the housing 104.

The measuring assembly 100 depicted in the drawings also has a shaft 110, which is rotatably coupled to lock sleeve 106, as seen in FIG. 5. The shaft 110 extends through the lock sleeve 106, as well as the pipe 102, the housing 104, and the lock 108. The shaft 110 is rotatably coupled to bearings 128*a-b* on the lock sleeve 106. The bearing 128*a-b* are fixedly coupled, e.g., via screws, to the housing 104. Accordingly, in some cases, the bearings 128*a-b* may inhibit axial movement of the shaft 110 relative to the lock sleeve 106.

The first arm 112*a* and the second arm 122*b* are coupled to the shaft 110. Each arm 112 has an L-shape. A first portion of each arm 112, may have a pin (not shown) extending therethrough. The pin may be abutted against the arm 112 and the shaft 110. The pin may, in some cases, inhibit movement of the arm 112 relative to the shaft 110.

A second portion of the first arm 112*a* has probes 114*a-c* removably coupled thereto. The probes 114*a-c* may extend through a portion of the first arm 112*a*. When coupled to the first arm 112a, the probes 114a-c would be perpendicular to the central axis of the housing 104.

A second portion of the second arm 112b has probes 114d-f removably coupled thereto. The probes 114d-e may extend through a portion of the second arm 112b. The probes 114d-e may extend through an aperture 406 of the shaft 110. Moreover, the probes 114d-f may be moved axially to the shaft 110 in the aperture 406. When coupled to the second arm 112a, the probes 114d-f would be perpendicular to the central axis of the housing 104.

In the locked configuration, as shown in FIG. 5, the lock sleeve 106 has outer surfaces 202 abutted against centralizers 120a-c. The lock sleeve 106 may be pushed against the centralizers 120a-c to cause the centralizers 120a-c to be abutted against the tubular 102.

The lock sleeve 106 may be slid to various position in the housing until the tapered surfaces 202 of the lock sleeve 106 are pushed against the centralizers 120a-c. The pushed centralizers 120a-c may be abutted against the tubular 102. For example, if a tubular 102 has a larger radius than that of the tubular 102 in FIG. 2B, the centralizers 120a-c would be abutted against a different portion of the outer surface 202. Moreover, the lock sleeve 106 would be disposed lower down the housing 104 (compared to the housing 104 in the tubular 102 of FIG. 2). Thus, by way of the tapered profiled of the outer surfaces 202, the measuring assembly 100 can accommodate tubulars 102 of varying internal radii.

Additionally, in the locked configuration, the lock 108 is wedged between an inner surface of the housing 104 and an outer surface of the lock sleeve 106. The lock 106 may have slits 204 extending from an end of the lock 108. When wedged between the housing 104 and the lock sleeve 106, the end of the lock 108 may be biased against the outer surface of the lock sleeve 106. Accordingly, the lock 108 has an outer surface abutted against the housing 104 and an inner surface abutted against the lock sleeve 106.

The lock 108 include pins 126 extending from the outer surface of the lock 108. The pins 126 may be disposed in grooves 206 of the housing 104. The pins 126 may be abutted ball bearings 404 disposed in the housing 104 and extending into the grooves 206. Accordingly, the lock 108, is some cases, is inhibited from being rotated or being moved axially.

Thus, in some cases, the lock sleeve 106 may be inhibited from being slid axially and/or rotated because 1) the lock sleeve 106 is abutted against the centralizers 120a-c, 2) the lock 108 is wedged between the housing 104 and the lock sleeve 106, and 3) the pins 126 are abutted against ball bearings 404.

Figure 6A:
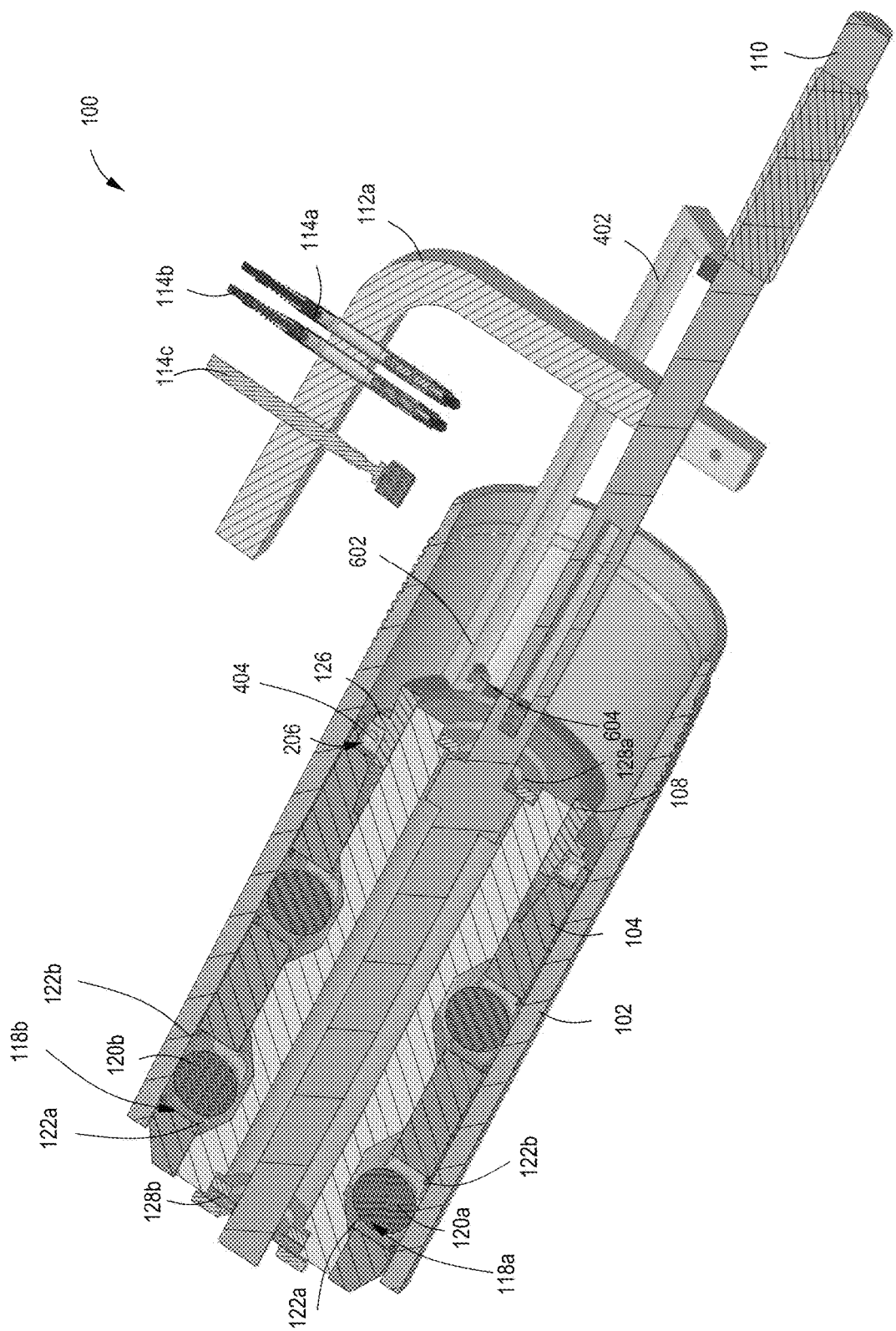
FIG. 6A illustrates a cross-sectional view of a measuring assembly in an unlocked configuration.
Figure 6B:
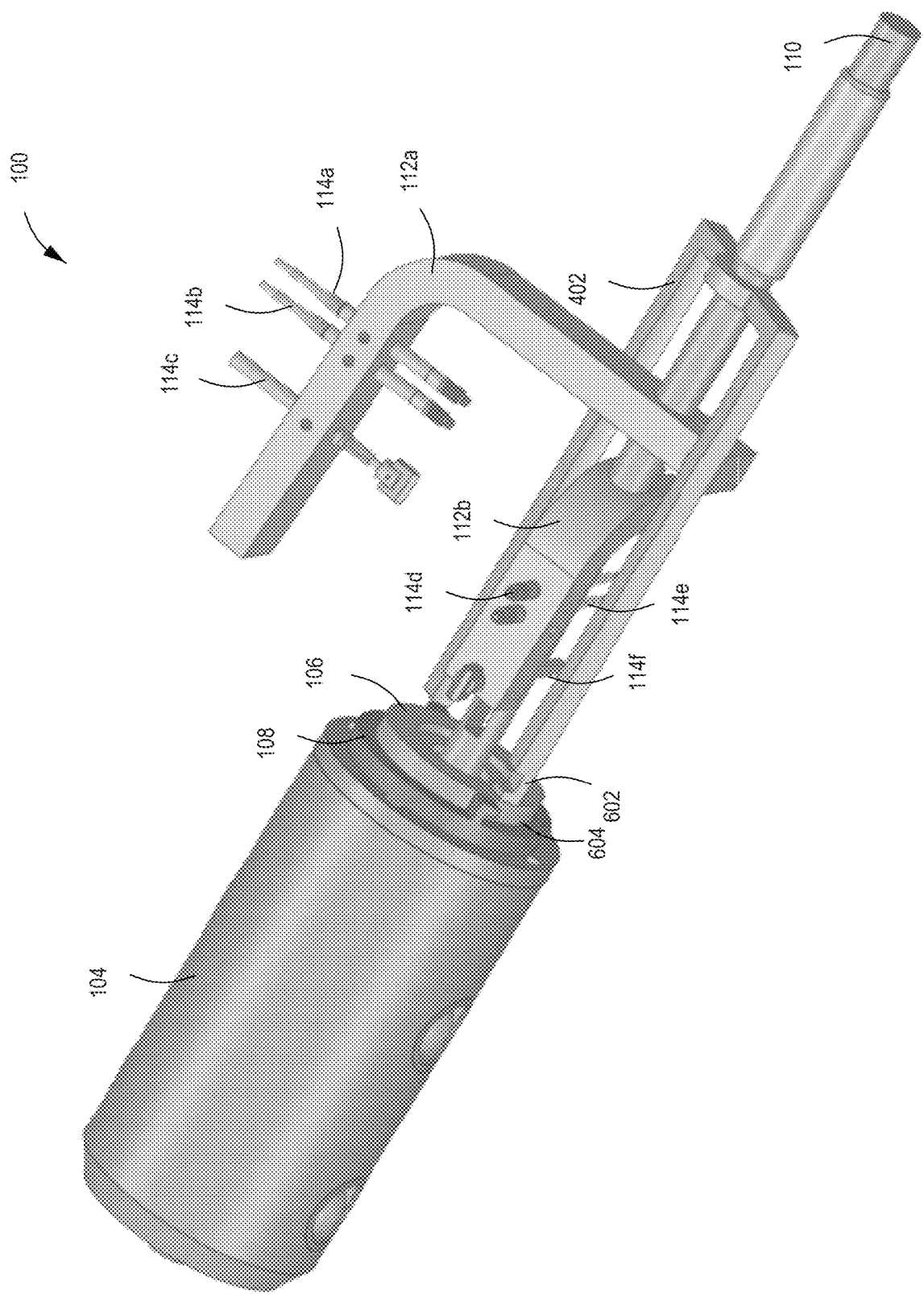
FIG. 6B illustrates a perspective view of a measuring assembly in a locked configuration.

FIG. 6A illustrates a cross-sectional view of a measuring assembly 100 having two arms 112a, 112b in an unlocked configuration. FIG. 6B illustrates a perspective view of a measuring assembly 100 having two arms 112a, 112b in an unlocked configuration.

Referring to FIGS. 6A-B, a measuring assembly 100 is disposed in a tubular 102. A lock sleeve 106 is disposed within a housing 104. The lock sleeve 106 has outer surfaces 202. The outer surface has grooves 124a-b. Portions of the centralizers 120a-c are disposed in the grooves 124a-b. In some cases, the centralizers 120a-c are not physical contact with the outer surfaces 202. Accordingly, in some cases, the centralizers 120a-c may not be abutted against the tubular 102. The centralizers 120a-c are said to be "floating" in the housing 104.

Additionally, in the unlocked configuration, the lock 108 is positioned away from the housing 104. The lock 108 is not abutted against the housing 104. Thus, the housing 104 may be freely moved along the tubular 102.

Referring to the views of FIGS. 1-3, an operator may perform the following steps to measuring a tubular 102, e.g., pipe, casing, drill pipe, or liner hanger, with a measuring assembly 100. First, the operator may insert a housing 104, a lock sleeve 106, and a lock 108 of the measuring assembly 100 into the tubular 102. The lock sleeve 106 may be slidably coupled to the housing 104 and the lock 108. Centralizers 120a-c may extend from an outer surface of the housing 104. As the housing 104 is being inserted into the tubular 102, one or more of the centralizers 120a-c may be abutted on an inner surface of the tubular 102. The one or more centralizers 120a-c may be rolled (in-place in corresponding apertures 118a-c) against the inner surface of the tubular 102, which facilitates pushing portions of the measuring assembly 100 into the tubular 102.

Afterwards, the operator may lock the measuring assembly 100 to the tubular 102. First, the operator may push the lock sleeve 106 in a direction towards the centralizers 120a-c until tapered outer surfaces 202 of the lock sleeve 106 are abutted against the centralizers 120a-c. The operator may continue pushing the lock sleeve 106 until the outer surfaces 202 push the centralizers 120a-c against the tubular 102. Because the lock sleeve 106 is cylindrical, the lock sleeve 106 would push all centralizers 120a-c evenly against the tubular 102. Thus, the measuring assembly 100 and the tubular 102 may share a central axis.

Next, the operator may push a lock 108 axially along the central axis of the housing 104 until the lock 108 is wedged between the housing 104 and the lock sleeve 106. Also, the operator may push pins 126 of the lock 108 into respective lock grooves 206, e.g., J-grooves, disposed in the housing 104. Next, the operator may rotate the lock 108, e.g., clockwise, which causes the pins 126 to move laterally in the respective lock grooves 206. Accordingly, the pins 126 may be abutted against surfaces of the housing 104. The abutted pins 126, may in some cases, inhibit axial movement of the lock 108 relative to the housing 104 and/or the lock sleeve 106.

Wedging of the lock 108 between the housing 104 and the lock sleeve 106 and abutment of the pins 126 of the lock 108 against the housing 104 may, in some cases, fixedly couple the lock sleeve 106 to the housing 104 and/or the lock 108. In other words, the lock sleeve 106 may be inhibited from rotation and/or axially movement relative to the housing 104 and/or the lock 108. Accordingly, the measuring assembly 100 is said to now be in a "locked configuration."

By setting the measuring assembly 100 in the locked configuration, the operator may rotate a centralized shaft 110 on the central axis of the measuring assembly 100. The operator may rotate an arm 112 coupled to the shaft 110 around the tubular 102. The arm 112 may have probes 114a-c coupled thereto. The probes 114a-c may measure several physical characteristics of the tubular, including thread spacing, thread contours or defects, and surface smoothness. The probes 114a-c may send signals representing measurements to a device or computer (not shown). The device or computer may receive the signal, digitize the signal, and/or store the digitized signal.

Reversing the sequence of steps described above would place the measuring assembly 100 in an unlocked configuration. The operator may uncouple the unlocked measuring assembly 100 from the tubular 102 accordingly.

Referring to the views of FIGS. 4-6, an operator may perform the following steps to measuring internal features and external features of a tubular 102, e.g., pipe, casing, drill pipe, or liner hanger, with a measuring assembly 100. First, the operator may insert a housing 104, a lock sleeve 106, and a lock 108 of the measuring assembly 100 into the tubular 102. The lock sleeve 106 may be slidably coupled to the housing 104 and the lock 108. Centralizers 120a-c may extend from an outer surface of the housing 104. As the housing 104 is being inserted into the tubular 102, one or more of the centralizers 120a-c may be abutted on an inner surface of the tubular 102. The one or more centralizers 120a-c may be rolled (in-place in corresponding apertures 118a-c) against the inner surface of the tubular 102, which facilitates pushing portions of the measuring assembly 100 into the tubular 102.

Afterwards, the operator may lock the measuring assembly 100 to the tubular 102. First, the operator may push (with the shaft 110) the lock sleeve 106 in a direction towards the centralizers 120a-c until tapered outer surfaces 202 of the lock sleeve 106 are abutted against the centralizers 120a-c. The operator may continue pushing the lock sleeve 106 until the outer surfaces 202 push the centralizers 120a-c against the tubular 102. Because the lock sleeve 106 is cylindrical, the lock sleeve 106 would push all centralizers 120a-c evenly against the tubular 102. Thus, the measuring assembly 100 and the tubular 102 may share a central axis.

Next, the operator may push a lock 108 axially along the central axis of the housing 104 until the lock 108 is wedged between the housing 104 and the lock sleeve 106. The operator may push the lock 108 with one or more ends 602 of a key 402. Also, the operator may push pins 126 of the lock 108 into respective grooves 206 disposed in the housing 104. Moreover, the operator may push the pins 126 across ball bearings 404 disposed in the grooves 206. Accordingly, the pins 126 may be abutted against the ball bearings 404. The abutted pins 126, may in some cases, inhibit axial movement of the lock 108 relative to the housing 104 and/or the lock sleeve 106.

Wedging of the lock 108 between the housing 104 and the lock sleeve 106 and abutment of the pins 126 of the lock 108 against the ball bearings 404 may, in some cases, fixedly couple the lock sleeve 106 to the housing 104 and/or the lock 108. In other words, the lock sleeve 106 may be inhibited from rotation and/or axially movement relative to the housing 104 and/or the lock 108. Accordingly, the measuring assembly 100 is said to now be in a "locked configuration."

By setting the measuring assembly 100 in the locked configuration, the operator may rotate a centralized shaft 110 on the central axis of the measuring assembly 100. The operator may rotate arms 112a, 112b coupled to the shaft 110 around the central axis of the tubular 102. The arm 112a, 112b have respective probes 114a-f coupled thereto. The probes 114a-c may measure several physical characteristics of one or more outer surfaces of the tubular, including thread spacing, thread contours or defects, and surface smoothness. The probes 114d-f may measure several physical characteristics of one or more inner surfaces of the tubular, including thread spacing, thread contours or defects, and surface smoothness. The probes 114a-f may send signals representing measurements to a device or computer (not shown). The device or computer may receive the signal, digitize the signal, and/or store the digitized signal.

The uncouple the measuring assembly 100 form the tubular 102, the operator may first couple ends 604 of the key 402 to hooks 602 of the lock 108. Once the key 402 is coupled to the lock 108, the operator may pull the key 402 and the lock 108 away from the tubular 102 until pins 126 of the lock 108 pushes ball bearings 404 away from the pins 126. Accordingly, the pins 126 would be slid past the ball bearing 404 out of the lock grooves 206.

Next, the operator may pull on the shaft 110 to reversing the remaining sequence of steps described above to place the measuring assembly 100 in an unlocked configuration. The operator may uncouple the unlocked measuring assembly 100 from the tubular 102 accordingly.

What is claimed as the invention is:

1. A measuring assembly for measuring one or more dimensions of a pipe that has an inner surface, and an outer surface, the measuring assembly comprising:
    a cylindrical housing capable of being disposed at least in part inside the pipe, the cylindrical housing having an inner housing space and a housing wall with an inner housing surface and an outer housing surface;
    a first bearing disposed in the housing wall; and
    a probe rotatably coupled to the housing, wherein the probe is capable of providing one or more dimensions of the pipe.

2. The measuring assembly of claim 1, wherein the first bearing is capable of being abutted against the cylinder.

3. The measuring assembly of claim 1, wherein the first bearing has a diameter greater than a thickness of the housing wall.

4. The measuring assembly of claim 1, wherein the first bearing is spherical.

5. The measuring assembly of claim 1, further comprising a second bearing extending through the outer housing surface.

6. The measuring assembly of claim 1, further comprising a second bearing and a third bearing, wherein the second bearing and the third bearing extend through the outer housing surface.

7. A measuring assembly for measuring one or more dimensions of a pipe that has an inner surface, and an outer surface, the measuring assembly comprising:
    a cylindrical housing capable of being disposed at least in part inside the pipe, the cylindrical housing having an inner housing space;
    a sleeve disposed in the inner housing space; and
    a probe rotatably coupled to the housing, wherein the probe is capable of providing one or more dimensions of the pipe.

8. The measuring assembly of claim 7, wherein the sleeve has a tapered outer surface.

9. The measuring assembly of claim 7, wherein the sleeve has a frustoconical outer surface.

10. The measuring assembly of claim 7, wherein the sleeve has a plurality of portions including a narrow portion having a diameter less than any diameter of any other portion of the sleeve.

11. The measuring assembly of claim 7, wherein the sleeve includes a portion capable being abutted against a bearing.

12. The measuring assembly of claim 7, wherein the sleeve has a narrow portion capable of receiving a portion of a bearing.

13. The measuring assembly of claim 7, wherein the sleeve has a lock portion capable being abutted against a first bearing.

14. The measuring assembly of claim 7, wherein the sleeve has a lock portion capable being abutted against a plurality of bearings.

15. The measuring assembly of claim 7, wherein the sleeve has a plurality of narrow portions including:
    a first narrow portion capable of receiving a portion of a first bearing; and a second narrow portion capable of receiving a portion of a second bearing.

16. A measuring assembly for measuring one or more dimensions of a pipe that has an inner surface, and an outer surface, the measuring assembly comprising:
   a housing capable of being disposed at least in part inside the pipe, the cylindrical housing having an inner housing space;
   a sleeve disposed in the inner housing space;
   a lock capable of inhibiting movement of the sleeve; and
   a probe rotatably coupled to the housing, wherein the probe is capable of providing one or more dimensions of the pipe.

17. The measuring assembly of claim 16, wherein the lock has a tapered outer surface.

18. The measuring assembly of claim 16, wherein the lock is disposed between the housing and the sleeve.

19. The measuring assembly of claim 16, wherein the lock has collapsible fingers.

20. The measuring assembly of claim 16, wherein the lock has collapsible fingers capable of being abutted against the sleeve.

* * * * *